R. KECK.
Silvering Mirrors.
No. 56,507.
Patented July 17, 1866.
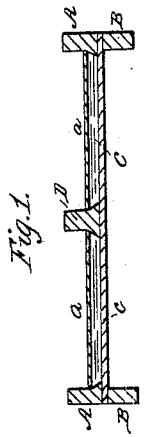
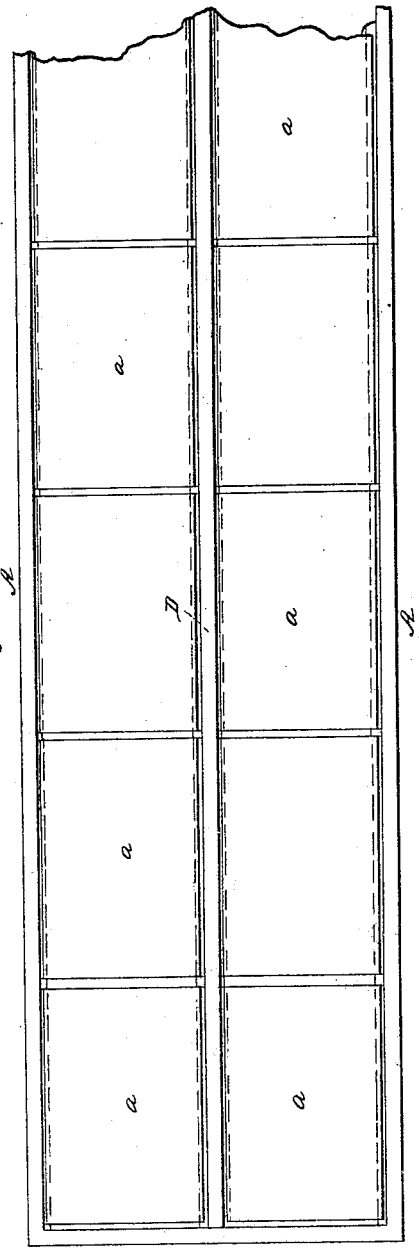
Witnesses:
Inventor:

UNITED STATES PATENT OFFICE.

RUDOLF KECK, OF CHICAGO, ILLINOIS, ASSIGNOR TO F. W. WOOD, SOLON D. STANBRO, JOSIAH WARREN, AND JULIUS H. ROYCE.

IMPROVEMENT IN SILVERING MIRRORS.

Specification forming part of Letters Patent No. 56,507, dated July 17, 1866.

*To all whom it may concern:*

Be it known that I, RUDOLF KECK, of the city of Chicago, in the county of Cook and State of Illinois, have invented a new and useful Improvement in the Manufacture of Mirrors; and I do hereby declare that the following is a full and exact description thereof, reference being had to the accompanying drawings, making part of this specification, in which—

Figure 1 represents the cross-section of the frames with glass plates put in, and Fig. 2 represents the top view of the same.

In my specification describing the improvement in the manufacture of mirrors invented by me before, and for which Letters Patent bearing date of November 7, 1865, and numbered 50,874, have been granted to my assignees, it was alleged that a sheet of india-rubber or other bad conductor of electricity, being put against the face of a glass plate immersed in a suitable silvering-solution, would preserve it clear from silvering, while the back side of the same plate, being freely exposed to the action of the solution, would be silvered, in consequence of which allegation a convenient apparatus was by me devised.

The experience proved, however, that the use of india-rubber or other non-conductors of electricity does not answer the purpose; that it does not preserve the side of the glass plate covered with it and immersed into silvering-solution from being silvered also; and that considerable additional labor is required for scraping the metal off the face of the plate before it can be used as a mirror. This induced me to devise another and entirely different method of manufacturing mirrors; and to enable others skilled in the art to make and use my invention, I will now describe its construction and operation.

Two light square wooden frames, A and B, are put upon each other, their width being regulated by the size of mirrors to be manufactured, while their length may be taken at will or in accordance with the size of the room of the building. A partition, C, made out of veneering-wood, thick pasteboard, or some other light and suitable material, is put between the frames, thus serving as a bottom to the upper frame and making a vat out of it. The frames and partition are fastened together by screws or other means.

The upper frame or vat is divided longitudinally by a low partition, D, whose both sides, as also those of the frame A, are made slanting.

The frames, with their partitions, are painted with solution of asphaltum or other substance that does not react on silvering-solution, making, at the same time, the frames water-tight.

The operation consists in the following: The upper frame or vat is filled with silvering-solution to the top of the slanting sides, and the glass plates $a\ a$ are put upon it, their edges resting on the slanting sides of the frame A and the partition D, spaces of half an inch being left between the plates for the purpose of conveniently placing them in or taking them out. In about twenty minutes, the sides of the plates that have been lying on the solution being silvered the plates are taken out, and when dry their silvered sides receive a coat of suitable varnish, while the frames are tilted over, the old solution poured out, the fresh solution put in, and new glass plates put in and adjusted.

It will be perceived from the above description that by this method only the back side of the glass plate is silvered, while the face-side remains perfectly clean; hence the additional labor of scraping off unnecessary silvering is avoided. Besides this, the whole process is simple and quick, and the expenses of constructing the apparatus are trifling.

Having thus fully described my method of manufacturing mirrors, what I claim as my invention, and desire to secure by Letters Patent, is—

The within-described method of precipitating upon glass plates nitrate of silver or other suitable substance or substances by means substantially such as herein described, or any other equivalent means.

RUDOLF KECK.

Witnesses:
H. J. COSTER,
W. C. DODGE.